United States Patent [19]

Mitarai et al.

[11] Patent Number: 4,879,548
[45] Date of Patent: Nov. 7, 1989

[54] FLAT KEYBOARD ARRANGEMENT

[75] Inventors: Akira Mitarai, Yamatokoriyama; Hachizou Yamamoto, Soraku, both of Japan

[73] Assignee: Sharp Kabushiki Kaisha, Osaka, Japan

[21] Appl. No.: 151,618

[22] Filed: Feb. 2, 1988

[30] Foreign Application Priority Data

Feb. 2, 1987 [JP] Japan .................................. 62-23081
Feb. 4, 1987 [JP] Japan .................................. 62-23966
Feb. 4, 1987 [JP] Japan .................................. 62-23967
Feb. 10, 1987 [JP] Japan .................................. 62-28981
Feb. 10, 1987 [JP] Japan .................................. 62-28982

[51] Int. Cl.⁴ .............................................. G09G 1/00
[52] U.S. Cl. .................................... 340/712; 340/703; 341/23
[58] Field of Search ............ 340/365 VL, 365 R, 701, 340/703, 711, 712

[56] References Cited

U.S. PATENT DOCUMENTS 4,017,848 4/1977 Tannas, Jr. ................... 340/365 VL
4,257,179 3/1981 Oka et al. .
4,313,108 1/1982 Yoshida .............................. 340/712
4,509,046 4/1985 Yamada ........................ 340/365 VL

FOREIGN PATENT DOCUMENTS 3235752 3/1984 Fed. Rep. of Germany ...... 340/365 VL
36134 11/1975 Japan .
75619 9/1979 Japan .
0148927 8/1984 Japan ........................... 340/365 VL

OTHER PUBLICATIONS

IBM Tech. Disc. Bul., "Electronically Changeable Keyboard Key Inscriptions", vol. 23, No. 3, 8-1980, Ghosh et al. pp. 1190-1203.
"Electronics" Published Jun. 1985 from a Japanese Magazine Color liquid crystal display employed in compact television set is an article from NIKKEI electronics published Sep. 10, 1984.

Primary Examiner—Gerald Brigance
Attorney, Agent, or Firm—Birch, Stewart, Kolasch & Birch

[57] ABSTRACT

A flat keyboard arrangement includes a color of blocks. Each block corresponds to a key unit and is liquid crystal display having a screen divided into a number capable of producing any natural color. A table is provided for storing color data of the blocks, and for storing function data representing the function assigned to blocks. A driver circuit is provided for driving the color liquid crystal display to illuminate one or more colors in accordance with the data stored in the table. A transparent touch switch arrangement is placed on the color liquid crystal display. The transparent touch switch arrangement has transparent sheet in which a plurality of transparent touch switches are located correspondingly to the blocks of the screen to define touch keys.

5 Claims, 7 Drawing Sheets

| KEY UNIT | | | | COLOR | FUNC |
|---|---|---|---|---|---|
| a | e | | | $C_1$ | $F_1$ |
| b | f | | x | $C_2$ | $F_2$ |
| c | g | | y | $C_3$ | $F_3$ |
| d | h | | z | $C_4$ | $F_4$ |
| 0 | 1 | 2 | 9 | $C_5$ | $F_5$ |
| 3 | 4 | 5 | | ⋮ | ⋮ |
| 6 | 7 | 8 | | ⋮ | ⋮ |

FLAT KEYBOARD ARRANGEMENT

BACKGROUND OF THE INVENTION

1. Field of the Invention

The present invention relates to a flat keyboard arrangement for use in electronic equipment, such as an electronic cash register, point of sales system, computer terminal, or the like

2. Description of the Prior Art

A flat keyboard arrangement generally includes a pressure sensitive touch panel which is equipped with an array of switches aligned in two orthogonal directions. Each switch defines a key. The surface of the touch panel is usually drawn with blocks to show the boundaries of the keys. The blocks may be numbered sequentially to enable the user to distinguish the keys. Alternatively, the user may write his own sign or mark on each key. However, the marks on the keys may be scraped off after a period of use.

An improved flat keyboard arrangement is disclosed in U.S. Pat. No. 4,257,179 to Oka et al. According to this reference, the flat keyboard includes a plurality of transparent touch sensitive switches aligned in a matrix. An item list sheet is placed blow the keyboard panel in order to mark each of the touch sensitive switches. The sheet may be replaced with another sheet by the rotation of a drum at which the top end side of the sheet is connected.

According to the arrangement disclosed in U.S. Pat. No. 4,257,179, the item list sheet is placed mechanically, so that the arrangement itself is bulky. Also, it takes time to change the sheets, so that the operator must pause while the sheet is being changed. Furthermore, it is very difficult to change the marks or indications on each sheet.

SUMMARY OF THE INVENTION

The present invention has been developed with a view to substantially solving the above described disadvantages and has for its essential object to provide an improved flat keyboard arrangement which is compact in size, stable in operation, and simple in operation to provide a desired color to each key.

In accomplishing these and other objects, a flat keyboard arrangement according to the present invention comprises a color liquid crystal display having a screen divided into a number of blocks, each block corresponding to a key unit and capable of producing any natural color. A table is provided for storing color data assigned to each of the blocks, and for storing function data representing the function assigned to the blocks. A driving circuit is provided for driving the color liquid crystal display to illuminate one or more colors in accordance with the data stored in the table. A transparent touch switch arrangement is placed on the color liquid crystal display. The transparent touch switch arrangement is defined by a transparent sheet in which a plurality of transparent touch switches are located corresponding to the blocks of the screen to define touch keys.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENTS

Figure 1:
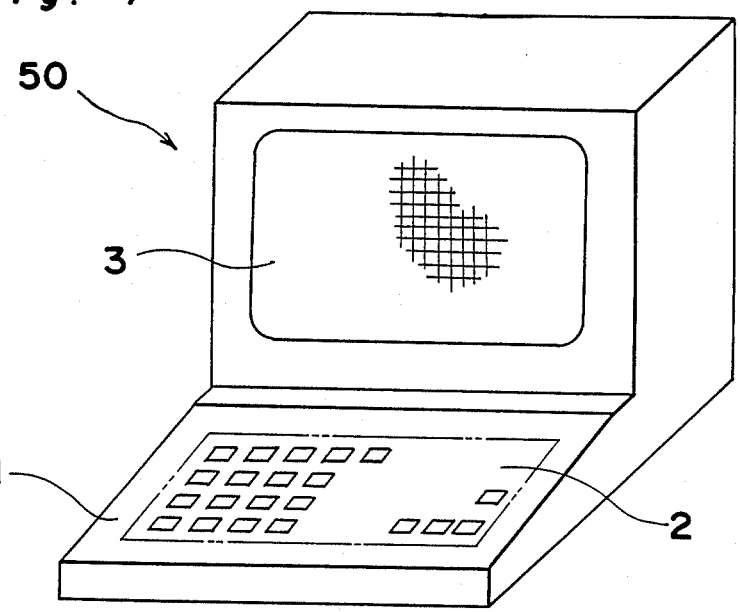
FIG. 1 is a diagrammatic view showing a flat keyboard arrangement, according to the present invention, provided in association with a computer terminal.

Referring to FIG. 1, a diagrammatic view of a flat keyboard arrangement 1 is shown provided in association with a computer terminal 50 which includes a display 3. The flat keyboard arrangement 1 has a pressure sensitive touch panel 2 which is shown in detail in FIG. 2.

Figure 2:
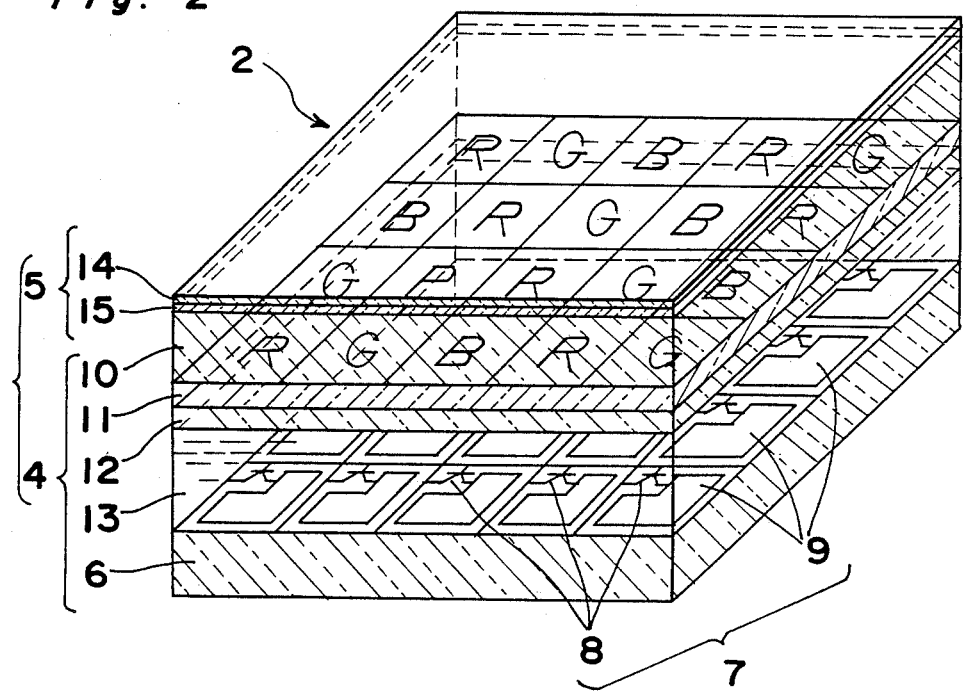
FIG. 2 is a fragmentary diagrammatic view showing a detail of the flat keyboard arrangement of the present invention.

Referring to FIG. 2, touch panel 2 includes a color liquid crystal display 4 and a touch switch layer 5.

Color liquid crystal display 4 includes top and bottom glass plates 10 and 6 which are held parallel to each other with a predetermined spacing. The bottom glass plate 6 is deposited with electrodes and semiconductor layers so as to define a thin-film transistor array 8 and also electrodes 9 for driving the liquid crystal drive. The thinfilm array 8 and the liquid crystal drive electrodes are generally referred to as signal electrodes 7. The top glass plate 10 is deposited with a mosaic color filter 11 defined by red, blue and green filter segments aligned in a predetermined repetition as shown in FIG. 2, and also with a common electrode 12. The mosaic color filter 11, which substantially serves as a screen of the liquid crystal display 4, is formed, for example, by a dyeing method such that a thin film made of an organic material, such as gelatin, is patterned into tiny blocks by the step of photolithography and, thereafter, each block is colored by the dye. One set of red, blue and green filter segments defines one picture cell. Liquid crystal 13 is filled in a space between common electrode 12 and electrode pattern 7 so that the light passing through each filter segment can be controlled at different levels. Thus, by combining red, blue and green colors in different voltage levels, each picture cell can produce any natural color, when viewed from a certain distance. Color liquid crystal display 4 will be further described later in connection with FIG. 5.

Touch switch layer 5 includes two transparent sheets 14 and 15 made of synthetic resin such as polyester deposited with transparent electrodes made of silver or chrome film. The detail of the touch switch layer 5 is described hereinbelow in connection with FIGS. 3, 4a, and 4b.

Figure 3:
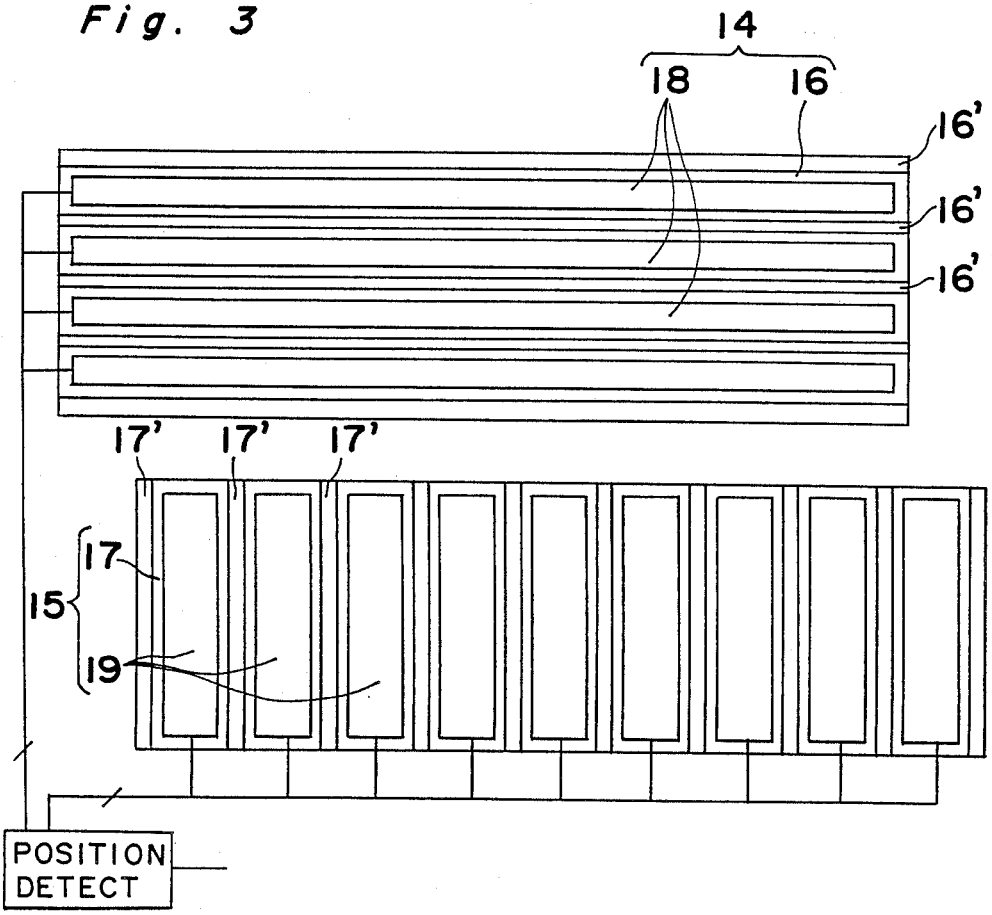
FIG. 3 is an exploded view of a touch panel.
Figure 4A:
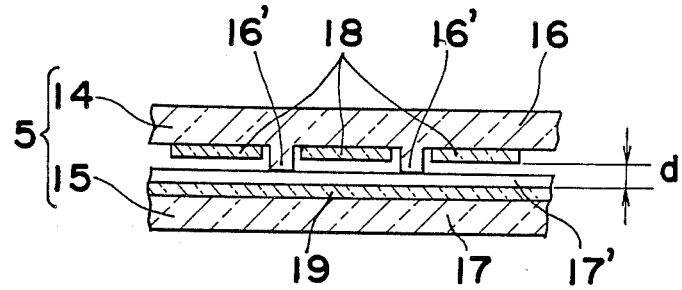
FIGS. 4a and 4b are cross-sectional views of the touch panel.
Figure 4B:
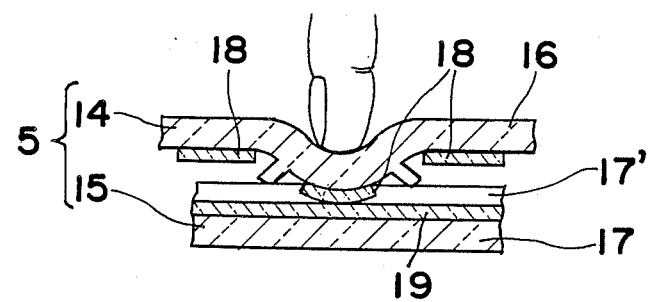

Referring to FIGS. 3, 4a and 4b, the transparent sheet 14 of the touch switch layer 5 includes a synthetic resin sheet 16 having walls 16' extending horizontally (when viewed in FIG. 3) parallel to each other with a predetermined spacing. The walls 16' are formed, for example, by the step of etching, fluting, or any other known method. Elongated horizontal electrodes 18 are deposited on sheet 14 in spaces between the walls 16'. According to the embodiment shown in FIG. 3, there are four horizontally extended electrodes 18. Similarly, the transparent sheet 15 includes a synthetic resin sheet 17 having walls 17' extending vertically (when viewed in FIG. 3) parallel to each other with a predetermined spacing. Elongated vertical electrodes 19 are deposited on sheet 15 in spaces between the walls 17'. According to the embodiment shown in FIG. 3, there are nine vertically extended electrodes 19. The number of the electrodes 18 or 19 may not be limited to those shown in the embodiment, but can be any other desired number.

The transparent sheets 14 and 15 are placed one over the other such that the walls 16' and 17' are held crossing and in contact with each other. Thus, electrodes 18 and 19 are placed facing each other with a predetermined spacing d, as shown in FIG. 4a. Thus, by the walls 16' and 17', a number of small blocks, such as thirty-six blocks in the example shown in FIG. 3, are formed. Each block defines a key unit.

Electrodes 18 and 19 are connected with a position detector 31 which detects the position of the depressed key. The position detection is carried out, for example, by the use of vertical and horizontal scan signals to sequentially scan all the keys at a very fast speed.

When sheet 14 is depressed, such as in a manner shown in FIG. 4b, one horizontal electrode 18 is held in contact with one vertical electrode 19. Thus, the key position o the depressed key is detected by the position detector 31. When the depressing force is removed, the electrodes 18 and 19 are again spaced apart by the resiliency of the sheet 14.

Figure 5:
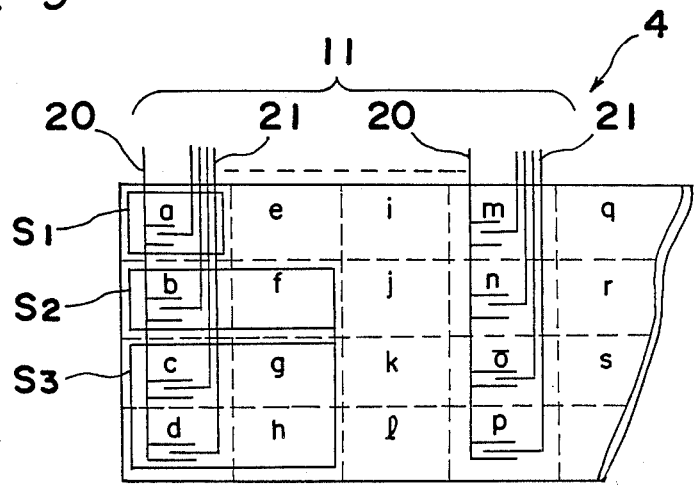
FIG. 5 is a diagrammatic view partly showing the key arrangement of the touch panel.
Figure 10:
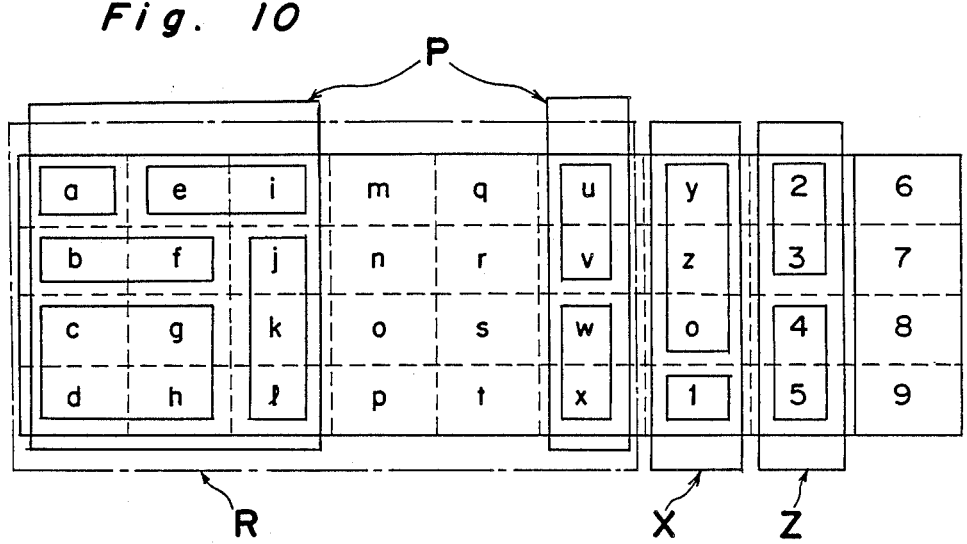
FIGS. 10 and 11 are views similar to FIGS. 5 and 6, but showing arrangements according to a third embodiment of the present invention.

Referring to FIG. 5, color liquid crystal display 4 is divided into small blocks a, b, c, d, . . . , shown by dotted lines. A manner in which the color liquid crystal display 4 is divided is best shown in FIG. 10. In the drawings, reference characters a, b, c, . . . , 0, 1, 2, . . . for the small blocks are given merely to designate thirty six blocks. The small blocks can be prepared by providing a number of color liquid crystal display segments aligned horizontally and vertically with each color display segment having a size approximately equal to the small block shown by the dotted lines, or by providing a large size color liquid crystal display with the image being split into small blocks as shown by the dotted lines by using a software program. A line 20 extends to each block for the connection with the common electrode 12, and a line 21 extends to each block for the connection with the signal electrode 7. The size of each block is approximately equal to the block defining the key unit, so that the key units are located correspondingly over the blocks of the color liquid crystal display.

Figure 6:
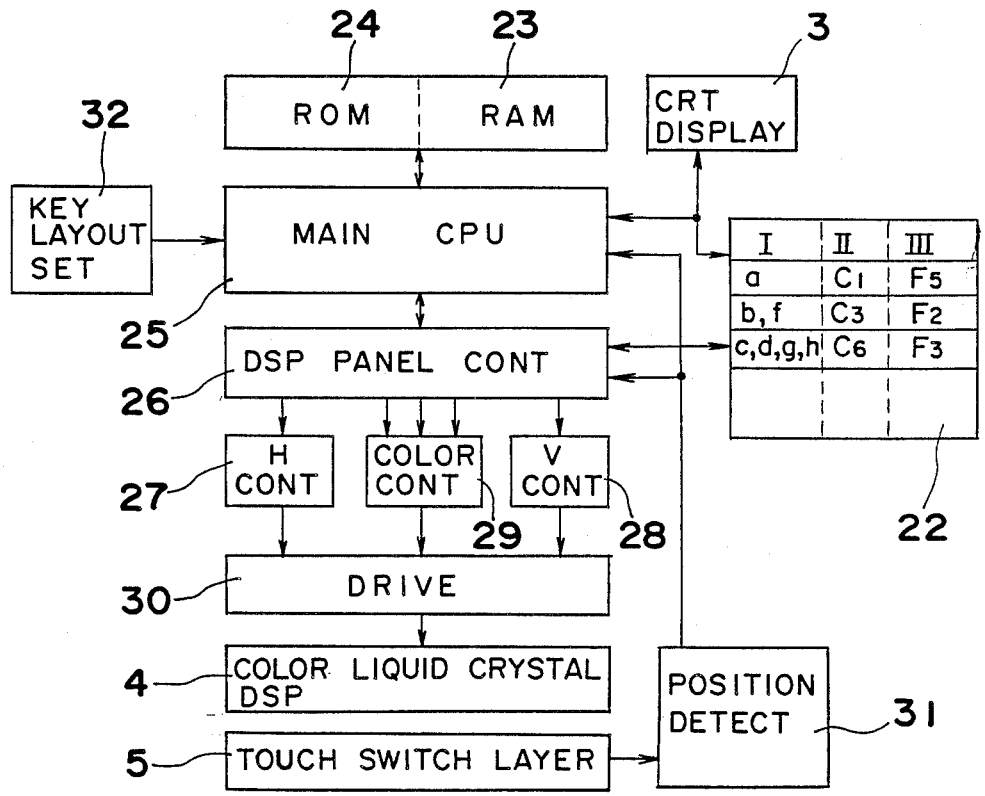
FIG. 6 is a block diagram of a circuit for controlling the touch panel according to a first embodiment of the present invention.

Referring to FIG. 6, a circuit for the flat keyboard arrangement according to a first embodiment is shown. The circuit includes a main CPU 25 which is coupled with ROM 24 and RAM 23. The main CPU 25 is also coupled with a key layout setting device 32, a key layout table 22, CRT display 3, and a display panel control 26. The display panel control 26 is coupled with the key layout table 22, horizontal control 27, vertical control 28 and color control 29. These controls 27, 28 and 29 are connected to a drive circuit 30 which is in turn connected to color liquid crystal display 4. Touch switch layer 5, provided on top of the color liquid crystal display 4 in a manner described above, is coupled with position detector 31 which is in turn connected to main CPU 25 and display panel control 26.

The circuit shown in FIG. 6 fundamentally has two operations: a key layout setting operation; and a key-in operation, which are selected by an operation selection switch (not shown) coupled to main CPU.

First, the key layout setting operation will be described. When a power switch (not shown) is turned on, main CPU 25 is operated in accordance with a program previously stored in ROM 24. Then, when the key layout setting operation is selected, main CPU 25 is set in a condition ready to read data from key layout setting device 32 and to store data in key layout table 22 in a manner described below.

Figures 7, 8:
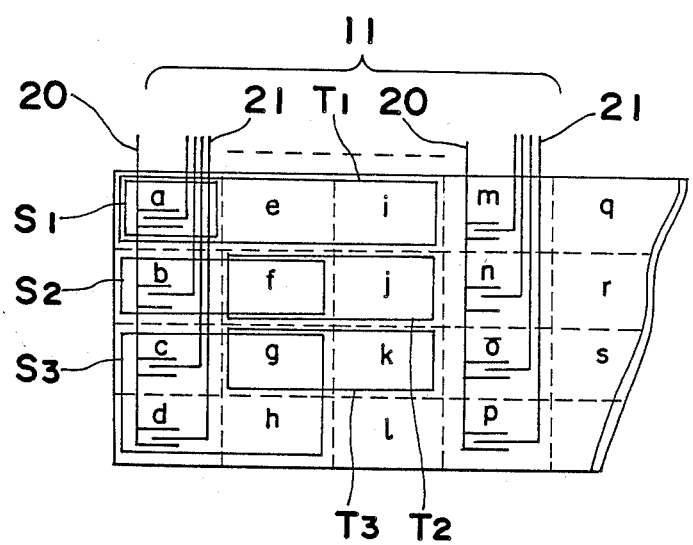
FIG. 7 is a top plan view of a key layout setting device provided in the circuit of FIG. 6.
FIGS. 8 and 9 are views similar to FIGS. 5 and 6, but showing arrangements according to a second embodiment of the present invention.

As shown in FIG. 7, key layout setting device 32 has a column for selecting one or more key units, a column for selecting a color and a column for selecting a function. The selected a key unit, a color or a function are stored in key layout table 22.

For example, when key unit a is selected for the first key layout selection, it is stored in table 22 column I, first row. Then, when color C1 is selected, it is stored in column II, first row, and when function F5 is selected, it is stored in column III, first row. In this manner, key unit a is specified as one key S1 (FIG. 5) and is assigned to effect function F5 and will be displayed in color C1. The function, such as function F5 may be, for example, any one of arithmetic rules, such as $+$, $-$, $\times$, or $\div$, or merely an input command for inputting data assigned to key a, or any other function.

According to another example, when key units b and f are selected for the second key layout selection, they are stored in table 22 column I, second row. Then, when color C3 is selected, it is stored in column II, second row, and when function F2 is selected, it is stored in column III, second row. In this manner, key units b and f are specified as one key S2 (FIG. 5) and are assigned to effect function F2, and they will be displayed in color C3.

In this manner, one or more key units in color liquid crystal display 4 are defined as one key for effecting one selected function and are distinguishable from other key units by a color given to those key units. Therefore, in one style, it is possible to give different colors for all the key units. In another style, it is possible to give the same color to a number of key units.

Next, the key-in operation will be described. When a power switch (not shown) is turned on, main CPU 25 is operated in accordance with a program previously stored in ROM 24. Then, when the key-in operation is selected, main CPU 25 operates the display panel control 26 to read data from key layout table 22 in a manner described below.

In accordance with the first row data in table 22, horizontal control 27 and vertical control 28 locate the position of key unit a, and color control 29 enables the display of key unit a in color C1. Then, in accordance with the second row data in table 22, horizontal and vertical controls 27 and 28 locate the positions of key units b and f, and color control 29 enables the display of key units b and f in color C3.

In this manner, the key units listed in table 22 are displayed in various colors.

Thereafter, when the operator depresses a colored unit key, its position is detected by position detector 31, and a signal indicating the detected position is applied to display panel control 26 and also to main CPU 25. Based on the detected position of the depressed key, display panel control 26 detects the function assigned to the depressed key and transmits the data representing the function to main CPU 25. Thus, main CPU 25 operates according to the selected function.

Figure 9:
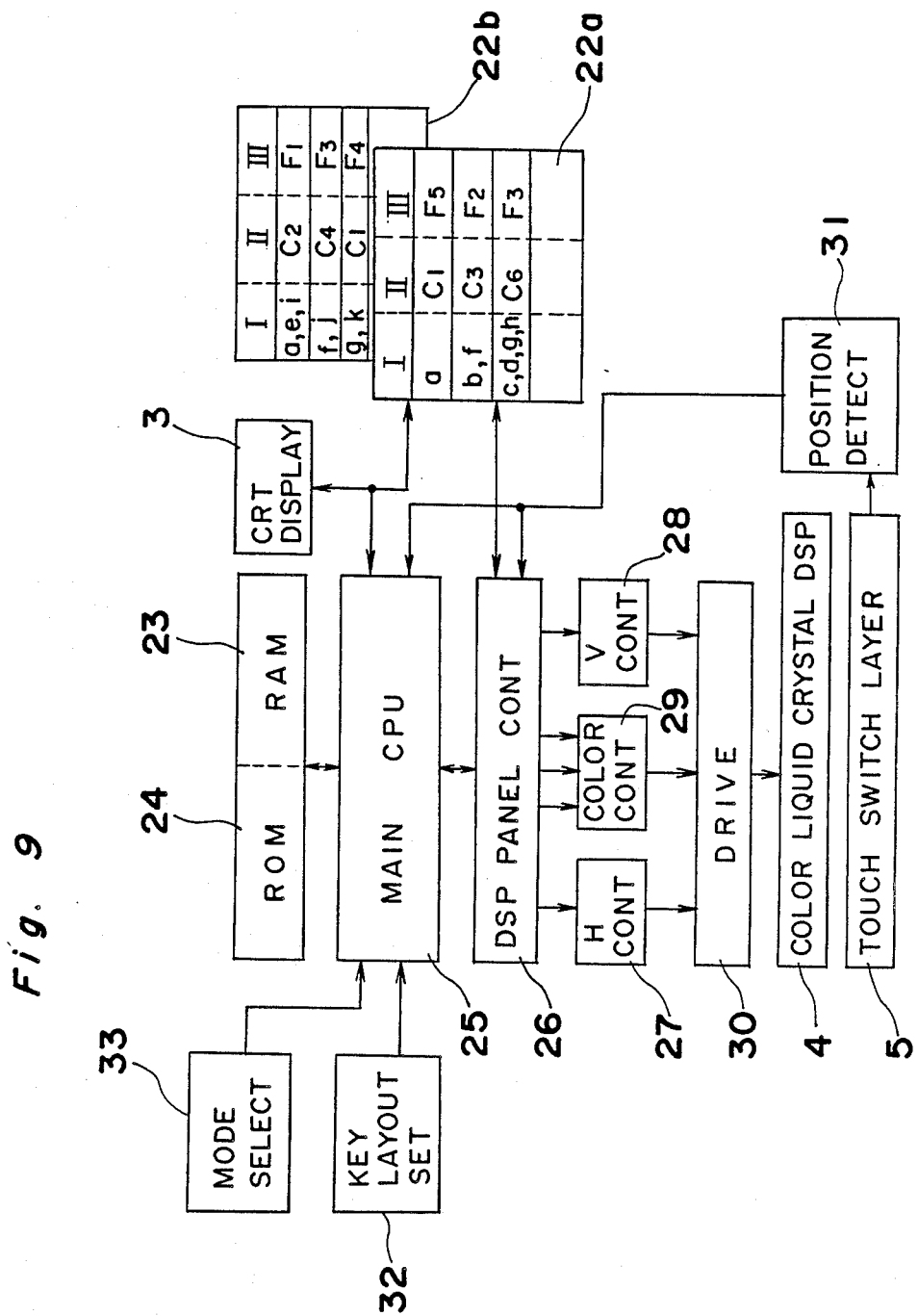

Referring to FIG. 9, a circuit for the flat keyboard arrangement according to a second embodiment is shown. When compared with the first embodiment shown in FIG. 6, two or more key layout tables 22a and 22b are provided, and also a mode selector 33 is provided, which are coupled to main CPU 25. Key layout tables 22a and 22b are also coupled to display panel control 26.

First, the key layout setting operation of the circuit of FIG. 9 will be described. Before storing data in tables 22a and 22b, a table to be stored is selected using mode selector 33. When one table is selected, such as table 22a, the key unit data, the color data and the function data are stored in columns I, II and III, respectively, in table 22a in the same manner described above. Thereafter, another table, such as table 22b is selected by mode selector 33. Thereafter, the key unit data, the color data and the function data are stored in columns I, II and III, respectively, in table 22b in the same manner described above. When all the required tables are stored with necessary data, the key layout setting operation completes.

Thus, for example, in table 22a: key unit a is specified as one key S1 (FIG. 8) and is assigned to effect function F5 and will be displayed in color C1; key units b and f are specified as one key S2 (FIG. 8) and are assigned to effect function F2, and they will be displayed in color C3; key units c, d, g and h are specified as one key S3 (FIG. 8) and are assigned to effect function F3, and so on. Also, for example, in table 22b: key units a, e, i are specified as one key T1 (FIG. 8) and is assigned to effect function F1 and will be displayed in color C2; key units f and j are specified as one key T2 (FIG. 8) and are assigned to effect function F3, and they will be displayed in color C4; key units g and k are specified as one key T3 (FIG. 8) and are assigned to effect function F4, and so on.

Next, the key-in operation of the circuit of FIG. 9 will be described. After the power switch (not shown) is turned on, and when the key-in operation is selected, the operator further selects the mode by mode selector 33. Main CPU 25 operates the display panel control 26 to read data from key layout table 22a or 22b, in accordance with the selected mode. Thus, color liquid crystal display 4 displays keyboard alignment according to the selected mode.

Thereafter, when the operator depresses a colored unit key, the function assigned to the depressed key is effected.

In the second embodiment, when the mode is changed, the color liquid crystal display changes the display immediately, so that the operator can carry out the key-in operation without a pause during the change of the mode, which pause would be necessary when the display is changed by the change of list sheet.

Figure 11:
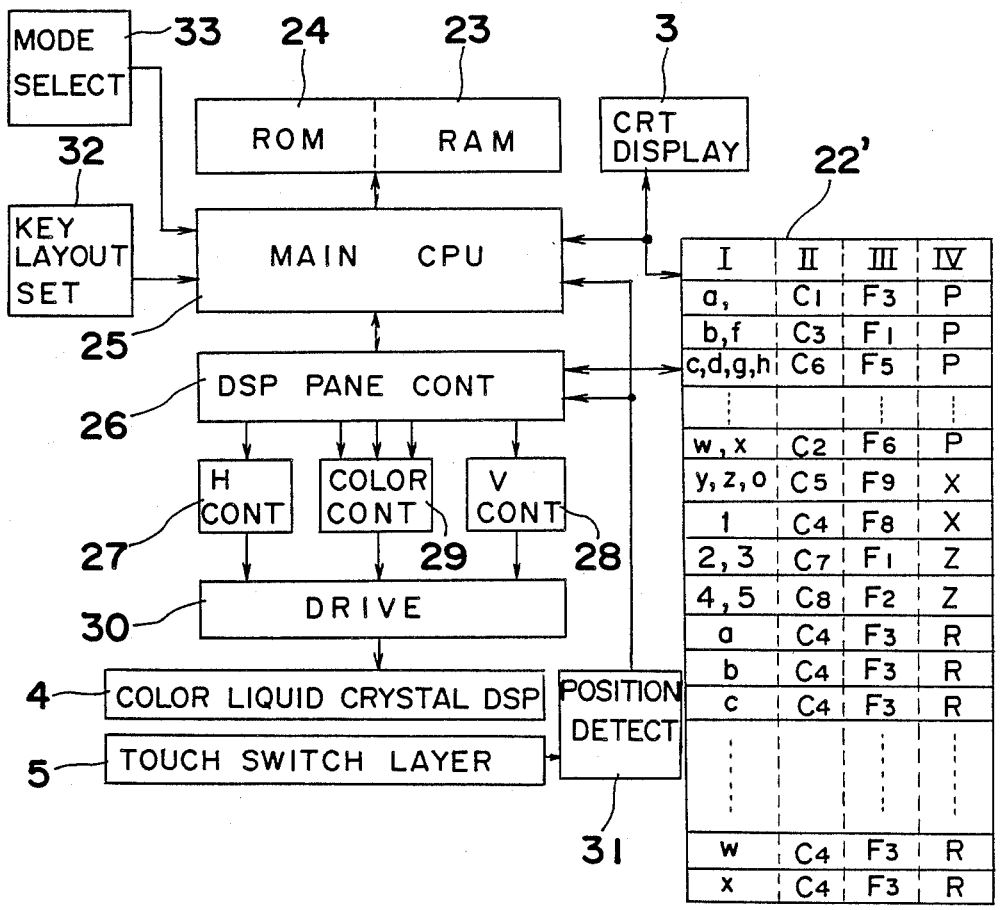

Referring to FIG. 11, a circuit for the flat keyboard arrangement according to a third embodiment is shown. When compared with the second embodiment shown in FIG. 9, only one, but a larger key layout table 22' is provided. In this embodiment, a fourth column IV is provided to store data representing the modes. The circuit arrangement is the same as that of the second embodiment.

First, the key layout setting operation of the circuit of FIG. 11 will be described. After the power switch is turned on and when the key layout setting operation is selected, main CPU 25 is set in a condition ready to read data from key layout setting device 32 and to store data i key layout table 22' in a manner described below.

By the use of key layout setting device 32, the table is filled with the data representing the selected key units, the selected colors and the selected functions, in columns I, II and III, respectively. Furthermore, by the use of mode selector 33, the data representing the selected modes are stored in column IV.

According to the third embodiment, in the case where the flat keyboard arrangement is provided for use in an electronic cash register, the mode may be selected from account adjusting mode Z, register mode R, setting mode P and check mode X.

For example, under the setting mode P, the key units a-1 and u-x may be used, as indicated in boxes P shown in FIG. 10. In this case, one function may be assigned to one key unit, while another function may be assigned to two or more key units. Also, the key units in boxes P are activated to produce the colors as set in table 22', column II, and the key units outside boxes P. In other words, i.e., the key units which will not be used under the setting mode P are inactivated so that the key units will not be illuminated. Alternatively, the key units which will not be used under the setting mode P may be activated to produces a color, such as an unattractive color like gray, to indicated that no function is assigned to these key units.

The key units under different modes are colored in a similar manner described above.

Next, the key-in operation of the circuit of FIG. 1 will be described in connection with a flow chart shown in FIG. 12. After the power switch is turned on (step #1), one of the four modes Z, R, P and X is selected (step #2) by the use of mode selector 33, and the selected mode is detected (step #3) to determine the flow direction to either one of step #4, #5, #6 or #7. It is assumed that the register mode R is selected, so that the program advances from step #3 to #5 and further to step #8. At step #8, the lines in table 22' with the mode indicated as R are read in by main CPU 25. The read data may be stored in RAM 23 (step #9). Then, based on the read data, panel control 26 controls the color liquid crystal display 4 (step #10) and, accordingly, the key units available under the register mode R are illuminated (step #11).

Then, the registration operation is carried out according to the known steps. For example, when the operator depresses a colored unit key, its position is detected by position detector 31, and a signal indicating the detected position is applied to display panel control 26 and also to main CPU 25. Based on the detected position of the depressed key and the data stored in RAM 23, display panel control 26 detects the function assigned to the depressed key and transmits the data representing the function to main CPU 25. Thus, main CPU 25 operates according to the detected function.

Figure 12:
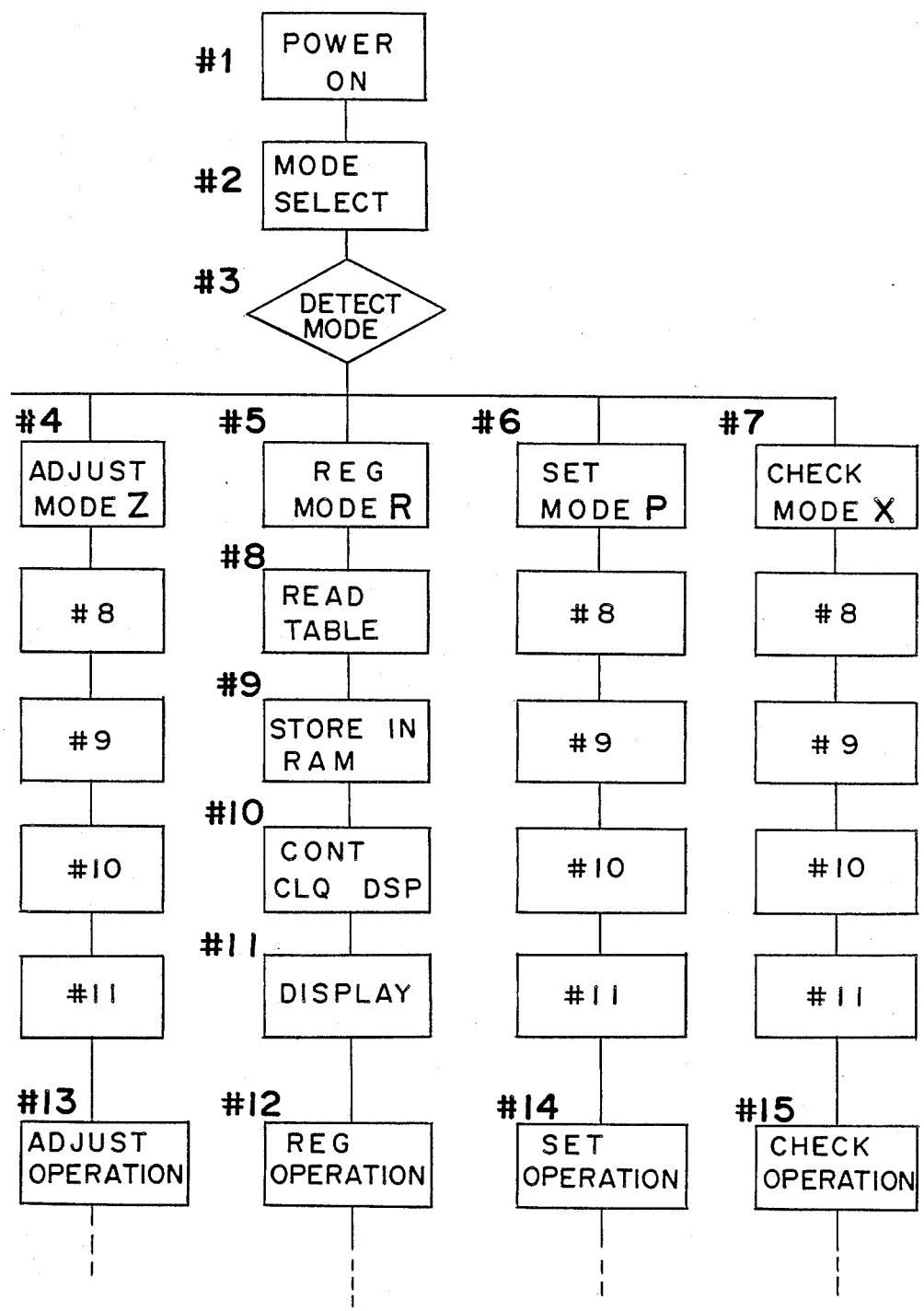
FIG. 12 is a flow chart showing an operation for controlling the touch panel under different modes.

It is to be noted that, steps #8–#11 may be applied to control other modes, as shown in FIG. 12.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A flat keyboard arrangement comprising:
   a color liquid crystal display means having a screen divided into a number of blocks, said blocks corresponding to an equal number of key units and capable of producing any natural color;
   table means for storing color data for each of said blocks, and for storing function data representing a function assigned to each of said blocks, wherein said table means stores both a color and a function for each of said blocks;
   means for driving said color liquid crystal display means to display said blocks in colors in accordance with the color data stored in said table means; and
   a transparent touch switch arrangement placed on said color liquid crystal display means, said transparent touch switch arrangement having a transparent sheet in which a number of transparent touch switches comprising said key units are located correspondingly to said blocks of the screen to define touch keys.

2. A flat keyboard arrangement as claimed in claim 1, further comprising a key unit setting means for setting color data and function data in said table means for each of said number of blocks.

3. A flat keyboard arrangement as claimed in claim 1, wherein said table means further stores mode data identifying a plurality of particularly set and stored table arrangements for said number of blocks.

4. A flat keyboard arrangement as claimed in claim 3, further comprising means for selecting a mode corresponding to one of said plurality of stored arrangements.

5. A flat keyboard arrangement as claimed in claim 1, further comprising position detecting means for detecting the enablement of a transparent touch switch.

* * * * *